United States Patent
Williams

(10) Patent No.: US 11,639,433 B2
(45) Date of Patent: May 2, 2023

(54) METHOD FOR FABRICATING A RUBBER-BASED ELASTOMERIC GLOVE/MATERIAL

(71) Applicant: HONEYWELL INTERNATIONAL INC., Morris Plains, NJ (US)

(72) Inventor: William Andrus Williams, Summerville, SC (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 647 days.

(21) Appl. No.: 16/710,280

(22) Filed: Dec. 11, 2019

(65) Prior Publication Data

US 2020/0109256 A1 Apr. 9, 2020

Related U.S. Application Data

(62) Division of application No. 13/849,126, filed on Mar. 22, 2013, now Pat. No. 10,538,642.

(51) Int. Cl.
*B29C 41/14* (2006.01)
*C08K 5/01* (2006.01)
(Continued)

(52) U.S. Cl.
CPC ............... *C08K 5/01* (2013.01); *B29C 41/14* (2013.01); *C08K 3/36* (2013.01); *B29K 2009/00* (2013.01);
(Continued)

(58) Field of Classification Search
CPC .................................................. B29C 41/14
See application file for complete search history.

(56) References Cited

U.S. PATENT DOCUMENTS 3,157,615 A * 11/1964 Stahly ...................... C08K 5/18
524/925
4,088,630 A 5/1978 Roos et al.
(Continued)

FOREIGN PATENT DOCUMENTS

| CA | 2784043 | * | 7/2011 |
| CN | 1287497 | * | 3/2001 |

OTHER PUBLICATIONS

Salisbury Catalog excerpt showing Personal Electrical Shock Protection & Accessories—Insulating Rubber Gloves—URL: http://pdf.directindustry.com/pdf/salisbury/gloves-sleeves/29806-55426.html.
(Continued)

*Primary Examiner* — Edmund H Lee
(74) *Attorney, Agent, or Firm* — Alston & Bird LLP

(57) ABSTRACT

Methods for fabricating rubber-based elastomeric materials are disclosed. In an embodiment, a method for fabricating a rubber-based elastomeric glove includes milling diene rubber to form first and second milled diene rubber portions; forming a first mixture by mixing a silica reinforcing component and a first antiozonant wax with the first milled diene rubber portion; forming a second mixture by mixing a second antiozonant wax with the second milled diene rubber portion; mixing the first mixture, the second mixture, and a solvent to form a viscous solution; and dipping a glove mold into the viscous solution for a selected number of dips, and evaporating the solvent from the glove mold between dips to form the rubber-based elastomeric glove, wherein the elastomeric glove has a thickness of at least about 30 mils, and wherein the elastomeric glove exhibits a flexural modulus of less than about 0.06 MPa.

20 Claims, 1 Drawing Sheet

(51) Int. Cl.
*C08K 3/36* (2006.01)
*B29K 9/00* (2006.01)
*B29K 309/00* (2006.01)
*B29K 491/00* (2006.01)

(52) U.S. Cl.
CPC ...... *B29K 2309/00* (2013.01); *B29K 2491/00* (2013.01)

(56) References Cited

U.S. PATENT DOCUMENTS

| | | | |
|---|---|---|---|
| 5,014,362 A | 5/1991 | Tillotson et al. | |
| 5,023,287 A * | 6/1991 | Evans | C08J 3/226 524/928 |
| 5,335,373 A | 8/1994 | Dresdner et al. | |
| 5,569,690 A | 10/1996 | Terakawa et al. | |
| 5,872,173 A | 2/1999 | Anand | |
| 6,031,042 A | 2/2000 | Lipinski | |
| 6,579,940 B1 * | 6/2003 | Dove | C08G 81/022 525/333.1 |
| 8,250,673 B2 | 8/2012 | Lipinski | |
| 2001/0049411 A1 | 12/2001 | Chestnut et al. | |
| 2001/0051675 A1 | 12/2001 | Ichikawa et al. | |
| 2004/0071909 A1 | 4/2004 | McGlothlin et al. | |
| 2006/0247337 A1 | 11/2006 | Cohen | |
| 2007/0260000 A1 * | 11/2007 | Hannon | C08K 5/18 252/399 |
| 2010/0048800 A1 | 2/2010 | Reuvekamp et al. | |
| 2011/0136938 A1 * | 6/2011 | Koster | B60C 1/00 523/218 |
| 2011/0306481 A1 | 12/2011 | Mine et al. | |
| 2012/0021155 A1 * | 1/2012 | Chen | C09D 111/02 433/136 |
| 2012/0288628 A1 | 11/2012 | Nethsinghe et al. | |

OTHER PUBLICATIONS

U.S. Appl. No. 13/849,126, filed Mar. 22, 2013, U.S. Pat. No. 10,538,642, Issued.
Advisory Action for related U.S. Appl. No. 13/849,126 dated Feb. 6, 2019, 2 pages.
Australian Examination Report for Application No. 2014201725 dated Mar. 3, 2017.
Examiner-Initiated Interview Summary for related U.S. Appl. No. 13/849,126 dated Aug. 28, 2019, 1 page.
Final Rejection dated Jan. 11, 2017 for U.S. Appl. No. 13/849,126.
Final Rejection dated Sep. 7, 2018 for U.S. Appl. No. 13/849,126.
Non-Final Rejection dated Feb. 22, 2018 for U.S. Appl. No. 13/849,126.
Non-Final Rejection dated Sep. 6, 2016 for U.S. Appl. No. 13/849,126.
Notice of Allowance and Fees Due (PTOL-85) dated Sep. 12, 2019 for U.S. Appl. No. 13/849,126.
Office Action for related Canadian Application No. 2,846,614 dated Apr. 14, 2020, 3 pages.
TPE2000, Mar. 2000, pp. 1-2.

* cited by examiner

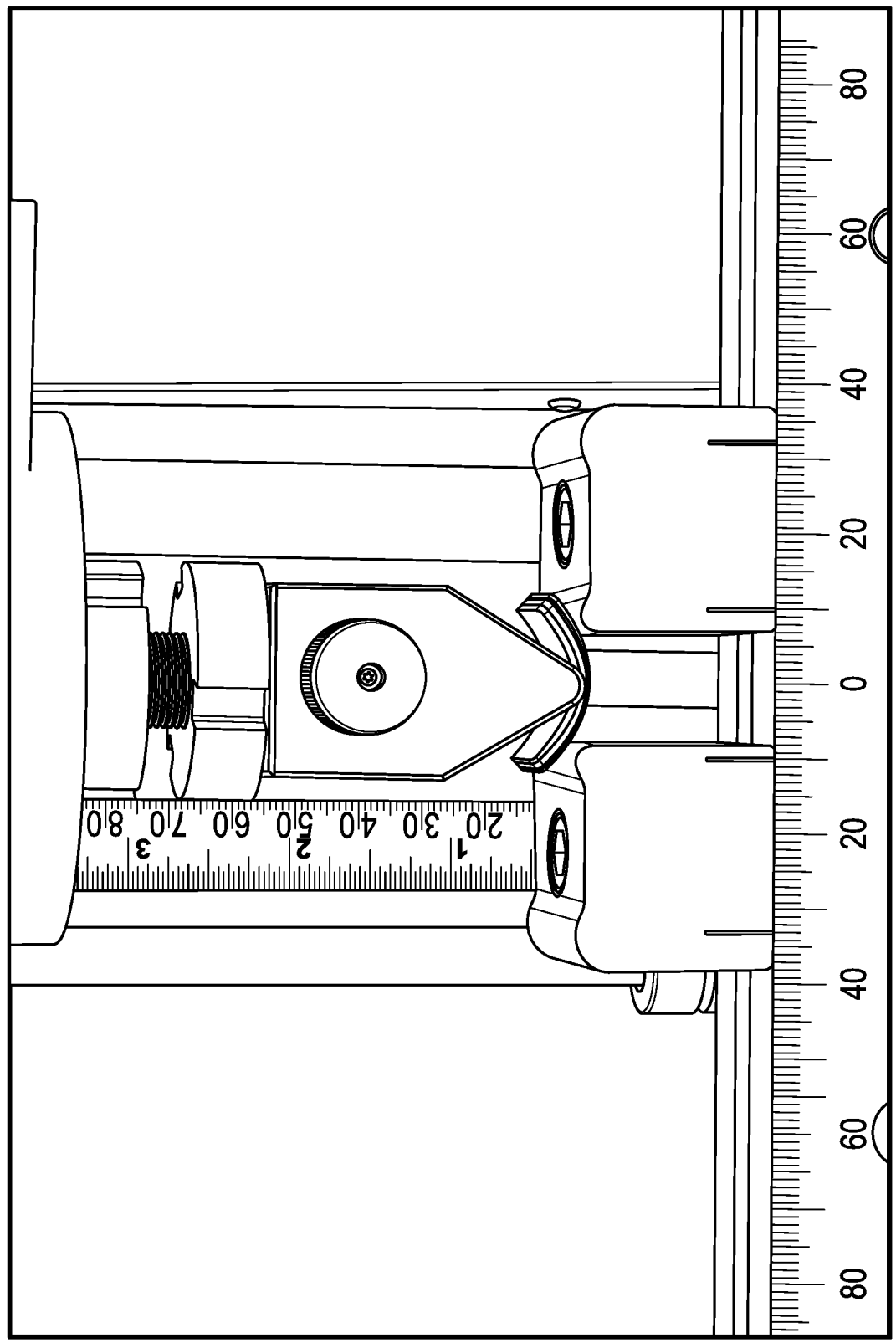

METHOD FOR FABRICATING A RUBBER-BASED ELASTOMERIC GLOVE/MATERIAL

CROSS-REFERENCE TO RELATED APPLICATION

This application claims priority to U.S. patent application Ser. No. 13/849,126, now U.S. Pat. No. 10,538,642, filed Mar. 22, 2013, which is incorporated herein by reference in its entirety.

TECHNICAL FIELD

The present disclosure generally relates to rubber-based elastomeric compositions and related articles of manufacture. More particularly, the present disclosure relates to rubber-based elastomeric compositions suitable for use in the manufacture of electrical linemen's gloves.

BACKGROUND

The American Standards of Testing Materials (ASTM) has strict requirements for the characteristics of electrical linemen's gloves, which include toughness, hardness, elongation to break, puncture resistance and strength, as outlined in ASTM-D120. In addition, the gloves must be flexible enough to allow the workmen to handle small objects and perform intricate manipulations. Currently available linemen's gloves, particularly after long periods of use, have been observed to cause significant fatigue in the hands of the user due to their relative stiffness and inflexibility. As such, the user's dexterity and ability to manipulate small objects can decrease significantly after long periods of wearing the gloves.

Accordingly, it is desirable to provide rubber-based elastomeric compositions suitable for use in the manufacture of linemen's gloves that exhibit improved flexural characteristics. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods for fabricating rubber-based elastomeric materials are disclosed. In an embodiment, a method for fabricating a rubber-based elastomeric glove includes milling diene rubber to form first and second milled diene rubber portions; forming a first mixture by mixing a silica reinforcing component and a first antiozonant wax with the first milled diene rubber portion; forming a second mixture by mixing a second antiozonant wax with the second milled diene rubber portion; mixing the first mixture, the second mixture, and a solvent to form a viscous solution; and dipping a glove mold into the viscous solution for a selected number of dips, and evaporating the solvent from the glove mold between dips to form the rubber-based elastomeric glove, wherein the elastomeric glove has a thickness of at least about 30 mils, and wherein the elastomeric glove exhibits a flexural modulus of less than about 0.06 MPa.

In another embodiment, a method for fabricating a rubber-based elastomeric material includes milling diene rubber to form a first milled diene rubber portion and a second milled diene rubber portion; forming a first mixture by mixing a silica reinforcing component and a first antiozonant wax with the first milled diene rubber portion; forming a second mixture by mixing a second antiozonant wax with the second milled diene rubber portion; mixing the first mixture, the second mixture, and a solvent to form a viscous solution; and dipping a mold into the viscous solution for a selected number of dips and evaporating the solvent from the mold between dips to form the rubber-based elastomeric material, wherein the rubber-based elastomeric material is provided in the form of a film having a thickness of at least about 30 mils, and wherein the film exhibits a flexural modulus of less than about 0.06 MPa.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWING

The rubber-based elastomeric compositions and associated articles of manufacture will hereinafter be described in conjunction with the following drawing FIGURE, wherein like numerals denote like elements, and wherein:

FIG. 1 is an exemplary experimental apparatus for testing the flexural modulus of a rubber-based elastomeric article in accordance with the present disclosure.

DETAILED DESCRIPTION

The following detailed description is merely exemplary in nature and is not intended to limit the disclosure or the application and uses of the disclosed embodiments. All of the embodiments and implementations of the rubber-based elastomeric compositions described herein are exemplary embodiments provided to enable persons skilled in the art to make or use the disclosed embodiments and not to limit the scope of the disclosure, which is defined by the claims. Furthermore, there is no intention to be bound by any expressed or implied theory presented in the preceding technical field, background, brief summary, or the following detailed description.

Embodiments of the present disclosure are generally directed to elastomeric compositions. The elastomeric compositions are suitable for use in variety of applications that include, but are not limited to, the manufacture of linemen's and other gloves. When used in such applications, the elastomeric compositions beneficially yield a glove with improved flexural qualities to reduce hand fatigue in the user. For example, as will be described in greater detail below, a Class 4 lineman's glove having a thickness of greater than about 50 mils, when produced using the disclosed rubber-based elastomeric compositions will exhibit a flexural modulus of less than about 0.06 MPa. This is an improvement of greater than 50% when compared with similar gloves known in the prior art.

Exemplary embodiments of the elastomeric compositions include a rubber component mixed with one or more additive components. Each such component will be discussed in greater detail below.

Suitable rubber components for use in the elastomeric compositions of the present disclosure are based on highly-unsaturated rubbers such as, for example, natural and/or synthetic rubbers and mixtures thereof. Representative of highly unsaturated rubbers that can be employed in the practice of this disclosure are diene rubbers. Such rubbers will ordinarily possess an iodine number of between about 20 to about 450, although highly unsaturated rubbers having a higher or a lower iodine number, e.g., about 50 to about 100, can also be employed. Illustrative of the diene rubbers that can be utilized are polymers based on conjugated dienes such as, for example, 1,3-butadiene; 2-methyl-1,3-butadiene; 1,3-pentadiene; 2,3-dimethyl-1,3-butadiene; and the like, as well as copolymers of such conjugated dienes with monomers such as, for example, styrene, alpha-methylstyrene, acetylene, e.g., vinyl acetylene, acrylonitrile, methacrylonitrile, methyl acrylate, ethyl acrylate, methyl methacrylate, ethyl methacrylate, vinyl acetate, and the like. Preferred highly-unsaturated rubbers include natural rubber, polyisoprenes such as cis-polyisoprene, 1,2-polyisoprene and 3,4-polyisoprene, polybutadiene, poly(styrenebutadiene), styrene-isoprene copolymers, isoprene-butadiene copolymers, styrene-isoprene-butadiene terpolymers, polychloroprene, chloro-isobutene-isoprene, nitrile-chloroprene, styrene-chloroprene, and poly (acrylonitrile-butadiene). A particularly preferred rubber component includes natural rubber grade CV60, which exhibits a low viscosity and is readily milled.

The elastomeric compositions may include one or more reinforcing components. Reinforcing components for use in the elastomeric compositions of the present disclosure include, but are not limited to, carbon blacks, metal oxides, such as silica (e.g., pyrogenic and precipitated), titanium dioxide, aluminosilicate, and alumina, siliceous materials including clays and talc, and the like and mixtures thereof. The reinforcing components may be hydrated or in anhydrous form.

In exemplary embodiments, silica is preferred as the reinforcing component. The silica material may be of any type that is known to be useful in connection with the reinforcing of rubber compositions. Representative of suitable silica reinforcing components include, but are not limited to, silica, precipitated silica, amorphous silica, vitreous silica, fumed silica, fused, silica, synthetic silicates such as aluminum silicates, alkaline earth metal silicates such as magnesium silicate and calcium silicate, natural silicates such as kaolin and other naturally occurring silica and the like. Also useful are highly dispersed silicas having, e.g., BET surfaces of from about 5 to about 1000 $m^2/g$ and preferably from about 20 to about 400 $m^2/g$ and primary particle diameters of from about 5 to about 500 nm and preferably from about 10 to about 400 nm. These highly dispersed silicas can be prepared by, for example, precipitation of solutions of silicates or by flame hydrolysis of silicon halides. The silicas can also be present in the form of mixed oxides with other metal oxides such, as, for example, Al, Mg, Ca, Ba, Zn, Zr, Ti oxides and the like. Commercially available silica reinforcing components known to one skilled in the art include, e.g., those available from such sources as Cabot Corporation under the Cab-O-Sil® tradename; PPG industries under the Hi-Sil and Ceptane tradenames; Rhodia under the Zeosil tradename and Degussa, AC under the Ultrasil® and Coupsil® tradenames. A particularly preferred silica reinforcing component is Hi-Sil® 233, which is a synthetic, amorphous silicon dioxide material that is provided in a powdered form.

The silica reinforcing material is incorporated into the elastomeric composition in an amount ranging from about 0.5 to about 1.5 PHR, and preferably about 0.75 to about 1.25 PHR. The term "PHR" is used herein in its art-recognized sense, i.e., as referring to parts of a respective material per one hundred (100) parts by weight of the rubber component.

The physical properties, performance characteristics, and durability of rubber-based elastomeric compositions are directly related to the number (crosslink density) and type of crosslinks formed in the composition. Typically, a vulcanization reaction is employed to produce such crosslinking. Vulcanization is conducted in the presence of one or more vulcanizing agents, such as sulfur-based vulcanizing agents. Examples of suitable sulfur-based vulcanizing agents include elemental sulfur (free sulfur) or sulfur donating vulcanizing agents, for example, an amine disulfide, polymeric polysulfide or sulfur olefin adducts. Preferably, the sulfur-based vulcanizing agent is elemental sulfur. As known to those skilled in the art, the sulfur-based vulcanizing agents are used in an amount ranging from about 0.25 to about 0.75 PHR, with a range of from about 0.4 to about 0.6 being preferred.

Generally, vulcanization begins with the use of one or more vulcanization activators. A preferred vulcanization activator is zinc oxide, and particularly preferred is the zinc oxide formulation sold under the tradename Zic Stick® 85. The activator, such as the zinc oxide material, is provided in an amount of about 2.0 to about 4.0 PHR, for example about 2.5 to about 3.5 PHR. Upon activation and heating, the elastomeric components being the crosslinking reaction. To assist this vulcanization reaction, one or more supplemental vulcanizing agents may be employed. For example, in various embodiments, the sulfur can be used alone or in conjunction with a metal fatty acid complex (e.g., zinc stearate, calcium stearate, etc.), or with the organic and fatty acids added alone, such as stearic acid, and optionally other curatives such an alkylperoxide compound, diamines or derivatives thereof. Particularly preferred is the use of stearic acid as a supplemental vulcanizing agent. Stearic acid may be provided in an amount of about 0.5 to about 1.5 PHR, for example about 0.8 to about 1.2 PHR.

Accelerators, including primary and optionally secondary accelerators, are used to control the time and/or temperature required for vulcanization and to improve the properties of the vulcanizate. The acceleration of the cure process is accomplished in the present disclosure by adding to the composition an amount of an accelerant, often an organic compound. The mechanism for accelerated vulcanization of natural rubber involves complex interactions between the curative, accelerator, activators and polymers. Ideally, the entire available curative is consumed in the formation of effective crosslinks which join together elastomer chains and enhance the overall strength of the rubber matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dehydrate, 2-(morpholinothio)benzothi-azole (MBS or MOR), blends of 90% MOR and 10% MBTS (MOR 90), N-tertiarybutyl-2-benzothiazole sulfenamide (TBBS), zinc thiazoles such as zinc 2-mercaptobenzothiazole (ZMBT), and N-oxydiethylene thiocarbamyl-N-oxydiethylene sulfonamide (OTOS), zinc 2-ethyl hexanoate (ZEH), and "thioureas." DTDM and/or ZMBT are employed in a preferred embodiment. The accelerators are used in a total amount ranging from about 1.0 PHR to about 3.0 PHR, for example about 1.5 PHR to about 2.5 PHR, such as about 1.75 to about 2.25 PHR. In a preferred embodiment, two different accelerators are employed. For example, DTDM may be provided in an amount of about 0.75 to about 1.25 PHR, and ZMBT may be provided in an amount of about 0.75 to about 1.25 PHR, with ZMBT serving as the primary accelerator, and DTDM serving as a supplemental accelerator/vulcanizer.

The elastomeric compositions may include one or more antidegradant components to preserve the properties of the vulcanized rubber. Antidegradants as used herein refer to one or more antioxidants, antiozonants, and waxes. Representative examples of such antidegradants include, but are not limited to, phenols and hindered phenols such as styrenated phenol, 2,2'-methylene-bis(4-methyl-6-tert-butylphenol) (sold under the tradename Lowinox® 22 M46 by the Chemtura Corporation), 4;4'-thiobis(6-tert-butyl-m-cresol)and the like and mixtures thereof; alkylated diphenylamines such as dioctyldiphenylamine, 4,4'-di(1-methyl-1-phenylpropyl)diphenylamine, dinonyldiphenylamines and the like and mixtures thereof; quinolines such as polymerized 1,2-dihydro-2,2,4-trimethylquinoline,6-ethoxy-1,2-dihydro-2,2,4,trimethylquinoline and the like and mixtures thereof; alkylated hydroquinones such as 2,5-di(tert-amyl) hydroquinone and the like and mixtures thereof; N,N'-bis (alkyl)-para-phenylenediamines such as N,N'-bis(1,4-dimethylpentyl)-paraphenylenediamine and the like and mixtures thereof; N,N'-bis(aryl)-paraphenylenediamines such as N,N'-bis(phenyl)-para-phenylenediamine and the like and mixtures thereof; N-(alkyl)-N'-(aryl)-para-phenylenediamines such as N-(1,3-dimethylbutyl)-N'-phenyl-para-phenylenediamine and the like and mixtures thereof; quinonediimines such as N-(1,3-dimethylbutyl)-N'-phenyl-quinonediimine and the like and mixtures thereof; thioesters such as dilauryl thiodipropionate, pentaerythritoltetrakis(3-(dodecylthio)propionate) and the like and mixtures thereof; phosphites such as tris(nonylphenyl) phosphite and the like and mixtures thereof; imidazoles such as 2-mercaptotoluimidazole and its salts such as zinc and the like and mixtures thereof; naphthylamines and alkylated naphthylamines such as N-phenyl-alphanaphthylamine and the like and mixtures thereof; and triazines such as 2,4,6-tris(N-(1,4-dimethylpentyl)-para-phenylenediamino)-1,3,5-triazine. Particularly preferred is the antioxidant 2,2'-methylene-bis(4-methyl-6-tert-butylphenol), which can be provided in the elastomeric composition in an amount from about 0.5 to 1.5 PHR, for example, about 0.75 to about 1.25 PHR.

In order to provide a sufficiently low flexural modulus to the resulting rubber-based elastomeric compositions, it is further desirable to include, as an additional antidegradant, one or more antiozonant waxes. Particularly preferred are microcrystalline/paraffinic antiozonant waxes, one example of which are available under the tradenames Nochek® 4756A and 4729A. Nochek 4756A has a congealing point of about 63° C. to about 66° C. and a kinematic viscosity at 100° C. of about 5.0 to about 7.0 cSt. Nochek 4729A, in contrast, has a congealing point of about 66° C. to about 69° C. and a kinematic viscosity at 100° C. of about 5.5 to about 7.5 cSt. It is preferred to use such an antiozonant wax(es) in a total amount of about 0.5 to about 3.0 PHR, for example about 1.0 to about 2.0 PHR, and more preferably about 1.1 to about 1.5 PHR. Where two different antiozonant waxes are employed, the second wax preferably has a congealing point that is greater than the first wax and a kinematic viscosity at 100° C. that is greater than the first wax. In such examples, the first wax is provided in an amount of about 0.2 to about 1.0 PHR, for example about 0.2 to about 0.4 PHR, and the second wax is provided in an amount of about 0.75 to about 2.5 PHR, for example about 0.75 to about 1.5. In a preferred embodiment, both Nochek 4756A and 4729A antiozonant, microcrystalline/paraffinic waxes are included in the rubber-based elastomeric compositions, with Nochek 4746A being included in an amount of about 0.2 to about 0.4 PHR, and Nochek 4729A being included in an amount of about 0.75 to about 1.5 PHR. When the above-noted wax(es) are provided at the levels indicated herein, the wax(es) exhibit not only antiozonant properties, but also serve as plasticizers to provide the rubber-based elastomeric composition with an improved flexural modulus, as will be discussed in greater detail below.

Other additive components that may be included in the rubber-based elastomeric compositions in accordance with the present disclosure include oils, resins, peptizing agents, pigments, and the like, as are well-known in the art. For example, where pigments are employed, they are preferably included in an amount of about 2 PHR, or more or less depending on the desired coloring characteristics of the end product.

As is known in the art, the elastomeric composition may be prepared by milling the rubber component and mixing the one or more additive components with the milled rubber component. It is preferred to initially prepare at least two milled-rubber containing mixtures, wherein the vulcanization activators/accelerators are separated such that vulcanization does not occur prior to a desired time.

The articles of manufacture in accordance with the present disclosure, such as linemen's gloves, are made by a process whereby the rubber-based elastomeric composition is dissolved in a solvent to produce a viscous solution. In one embodiment, the solvent is a volatile organic solvent such as naphtha. However, in other embodiments, neutral, non-volatile solvents such as water may be employed. A mold is then dipped into the rubber solution. This coats the mold with the rubber solution. When the coated mold is removed from the solution, the solvent is allowed to evaporate. This dipping procedure is then repeated as many as 30 or more times to produce the required thickness of rubber needed for a glove. The exact number of dips, and thus the thickness of the glove, is dependent upon the type of glove being produced. The complete dipping process can take up to a week or more to produce a glove. Evaporation of the solvent cannot be too fast or a large number of voids, or inconsistencies within the surface, will be generated. Once the required thickness has been reached, the rubber is vulcanized, or cured, in an oven. The glove is then tested for physical defects and various properties, including electrical properties, to ensure compliance with ASTM-D120.

Typical linemen's gloves produced in accordance with the present disclosure are prepared by dipping the mold a sufficient number of times to produce a glove thickness of greater than about 30 mils, for example greater than about 70 mils. In one particular embodiment, the gloves produced are Class 4 linemen's gloves that have a thickness from about 95 mils to about 120 mils.

ILLUSTRATIVE EXAMPLES

The present disclosure is now illustrated by the following non-limiting examples. It should be noted that various changes and modifications can be applied to the following examples and processes without departing from the scope of this disclosure, which is defined in the appended claims. Therefore, it should be noted that the following example should be interpreted as illustrative only and not limiting in any sense.

A rubber-based elastomeric composition was prepared in accordance with the following procedure: Additive components were added to milled natural rubber to form two mixtures according to TABLE 1.

TABLE 1

| Components | PHR | Lbs |
| --- | --- | --- |
| Mixture 1 | | |
| TSR-CV60 - Natural Rubber | 100 | 97.657 |
| Lowinox 22m46 - Antidegradant | 1 | 0.97657 |
| Nochek 4756A - Antiozonant Wax | 0.52 | 0.507816 |
| Stearic acid - Vulcanizing agent | 1 | 0.97657 |
| Hisil 233 - Reinforcing component | 2 | 1.95314 |
| Sulfur - Vulcanizing Agent | 1 | 0.97657 |
| DTDM Sulfan R/Vanax A - Vulcanization accelerator | 2 | 1.95314 |
| Total | | 105.0008 |
| Mixture 2 | | |
| TSR-CV60 - Natural Rubber | 100 | 90.46 |
| Lowinox 22m46 - Antidegradant | 1 | 0.9046 |
| Nochek 4729a - Antiozonant Wax | 2.08 | 1.881568 |
| Stearic acid - Vulcanizing agent | 1 | 0.9046 |
| Zic -Stick 85 - Vulcanization activator | 6 | 5.4276 |
| ZMBT - Vulcanization accelerator | 2 | 1.8092 |
| Pigment | 4 | 3.6184 |
| Total | | 105.006 |
| Batch Total | | 210.0068 |

Mixtures 1 and 2 were prepared separately, and then they were mixed together (in a 1:1 ratio) with a volatile organic solvent (naphtha) to form a viscous solution. A glove mold was repeatedly dipped into the solution, with evaporation of the solvent occurring between dips, to form gloves having a thickness of about 70 mils to about 75 mils. The gloves were then tested for their flexural characteristics.

Flexural Characteristics

As noted above, currently available linemen's gloves, particularly after long periods of use, have been observed to cause significant fatigue in the hands of the user due to their relative stiffness and inflexibility. As such, the user's dexterity and ability to manipulate small objects can decrease significantly after long periods of wearing the gloves. To alleviate this hand fatigue, the rubber-based elastomeric articles in accordance with the present disclosure were formulated to exhibit improved flexural characteristics. As used herein, the term "improved flexural characteristics" refers to an elastomeric composition having a flexural modulus that is less than a comparable elastomeric composition of similar thickness. For example, the rubber-based elastomeric compositions, as will be discussed in greater detail below, exhibit a flexural modulus that is at least 30% less than comparably thick prior art elastomeric compositions, for example at least 50% less.

The flexural modulus is a measure of how a material will deform and experience strain when weight or force is applied. It describes the ability of a material, with a specific cross-section, to resist bending when placed under stress. This property is important in many polymer and engineering designs, and is frequently used to select and specify materials that have or impart the desired levels of stiffness. Flexural modulus defines the relationship between a bending stress and the resulting strain. Strain is a measure of the amount that a material will deform when a stress is applied. Elastic strain is reversible and will disappear after the stress is removed, meaning the material will return to its original state. Rubber is an example of this property. Flexural modulus can be plotted in a stress-strain curve, which shows how strain changes with applied bending stress. The slope of this curve in the region where elastic strain occurs defines the flexural modulus of the material. The units of measure are pounds per square inch (psi) or Newton's per square meter, also known as Pascals (Pa).

Flexural modulus is determined experimentally in a laboratory, using a sample of material with a specific shape and dimensions. The flexural test measures the force necessary to bend a beam of known dimensions that has a force applied at three points. The beam is supported on the bottom side near both ends and a force is applied to the top at the center point, between the bottom supports. This is known as three-point loading conditions and is referred to as the three point bend test. A force is applied and the deflection or movement of the beam is measured. Per ASTM 790, for a 3-point deflection test of a beam, the following equation for the flexural modulus E(bend) is used:

$$E(\text{bend}) = L^3 F/(4wh^3 d)$$

where: w and h are the width and height of the beam, L is the distance between the two outer supports, and d is the deflection due to load F applied at the middle of the beam. FIG. 1 illustrates this experimental apparatus.

When wearing a 30 to 120 mil linemen's glove the end user will experience a high level of hand fatigue and a loss of dexterity due to the high resilience of the glove. Using a Universal test machine with Flexural Modulus capability it is possible to measure not only the relative stiffness of the glove that represents the force need to close the hand but also the resilient force of the glove as it recovers it original shape. Thus it is possible to measure the force to close the hand as well as the resistant force to keep the hand closed. The sum of these forces represents what the end user perceives as hand fatigue and loss of dexterity while wearing the glove.

As noted above, rubber-based elastomeric films prepared in accordance with embodiments of the present disclosure exhibit a significantly improved flexural modulus in comparison to prior art elastomeric films of similar thickness. This improvement is demonstrated with reference to six rubber-based elastomeric films specimens that were prepared for flexural modulus testing, as shown in TABLE 2. Each of the specimens was 1 inch in width, and between 0.071 and 0.082 inches in thickness. Specimens 1, 3, 5, and 6 represent various examples of glove specimens manufactured with prior art elastomeric compositions. Specimens 2 and 4 represent glove specimens prepared in accordance with the present example (as set forth in TABLE 1) (the difference between Specimen 2 and Specimen 4 being the particular pigment used).

TABLE 2

| Material | Width in | Thickness in | Flexural Modulus MPa |
| --- | --- | --- | --- |
| Specimen 1 | 1 | 0.075 | 0.091205758 |
| Specimen 2 | 1 | 0.073 | 0.039548066 |
| Specimen 3 | 1 | 0.075 | 0.095241464 |
| Specimen 4 | 1 | 0.071 | 0.03514574 |
| Specimen 5 | 1 | 0.082 | 0.146435437 |
| Specimen 6 | 1 | 0.081 | 0.13953207 |

As shown in TABLE 2, the flexural modulus of Specimens 2 and 4 is less than about 0.06 MPa, and in particular is less than about 0.04 MPa. Further, the flexural modulus is significantly less (about 0.05 to about 0.10 MPa less) than comparable prior art samples. Thus, the user of a glove prepared in accordance with the present example (having a thickness of, for example, greater than about 30 mils or greater than about 70 mils) will experience significantly less hand fatigue than would be experience performing similar tasks using linemen's gloves known in the prior art. This will afford the user with an improved work experience and an improved work efficiency.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the processes without departing from the scope defined by the claims, which includes known equivalents and foreseeable equivalents at the time of this disclosure.

What is claimed is:

1. A method for fabricating a rubber-based elastomeric glove, the method comprising:
    milling diene rubber to form a first milled diene rubber portion and a second milled diene rubber portion;
    forming a first mixture by mixing a silica reinforcing component and a first antiozonant wax with the first milled diene rubber portion;
    forming a second mixture by mixing a second antiozonant wax with the second milled diene rubber portion;
    mixing the first mixture, the second mixture, and a solvent to form a viscous solution; and
    dipping a glove mold into the viscous solution for a selected number of dips, and evaporating the solvent from the glove mold between dips to form the rubber-based elastomeric glove, wherein the elastomeric glove has a thickness of at least about 30 mils, and wherein the elastomeric glove exhibits a flexural modulus of less than about 0.06 MPa.

2. The method of claim 1 wherein the elastomeric glove includes the silica reinforcing component in a total amount of about 0.5 to about 1.5 parts per hundred rubber (PHR), the first antiozonant wax in a total amount of about 0.2 to about 1.0 PHR; and the second antiozonant wax in a total amount of about 0.75 to about 2.5 PHR.

3. The method of claim 2 wherein the elastomeric glove includes the silica reinforcing component in a total amount of about 0.5 to about 1.5 parts per hundred rubber (PHR), the first antiozonant wax in a total amount of about 0.2 to about 0.4 PHR; and the second antiozonant wax in a total amount of about 0.75 to about 1.5 PHR.

4. The method of claim 2 wherein the first antiozonant wax has a first kinematic viscosity at 100° C., wherein the first antiozonant wax has a first congealing point, wherein the second antiozonant wax has a second kinematic viscosity at 100° C. greater than the first kinematic viscosity, and wherein the second antiozonant wax has a second congealing point greater than the first congealing point.

5. The method of claim 1 wherein:
    forming the first mixture comprises mixing the silica reinforcing component, the first antiozonant wax, a first antidegradant, a first vulcanizing agent, and a first vulcanization accelerator with the first milled diene rubber portion; and
    forming the second mixture comprises mixing the second antiozonant wax, a second antidegradant, a second vulcanizing agent, a second vulcanization activator, a second vulcanization accelerator, and a pigment with the second milled diene rubber portion.

6. The method of claim 5 wherein:
    forming the first mixture comprises excluding the second antiozonant wax from the first mixture; and
    forming the second mixture comprises excluding the silica reinforcing component from the second mixture.

7. The method of claim 5 wherein:
    the first mixture consists essentially of the first antiozonant wax, the silica reinforcing component and the first milled diene rubber portion; and
    the second mixture consists essentially of the second antiozonant wax and the second milled diene rubber portion.

8. The method of claim 5 wherein:
    the first mixture consists of the first milled diene rubber component, the silica reinforcing component, the first antiozonant wax, a first antidegradant, a first vulcanizing agent, and a first vulcanization accelerator; and
    the second mixture consists of the second milled diene rubber component, the second antiozonant wax, a second antidegradant, a second vulcanizing agent, a second vulcanization activator, a second vulcanization accelerator, and a pigment.

9. A method for fabricating a rubber-based elastomeric material, the method comprising:
    milling diene rubber to form a first milled diene rubber portion and a second milled diene rubber portion;
    forming a first mixture by mixing a silica reinforcing component and a first antiozonant wax with the first milled diene rubber portion;
    forming a second mixture by mixing a second antiozonant wax with the second milled diene rubber portion;
    mixing the first mixture, the second mixture, and a solvent to form a viscous solution; and
    dipping a mold into the viscous solution for a selected number of dips and evaporating the solvent from the mold between dips to form the rubber-based elastomeric material, wherein the rubber-based elastomeric material is provided in the form of a film having a thickness of at least about 30 mils, and wherein the film exhibits a flexural modulus of less than about 0.06 MPa.

10. The method of claim 9 wherein the film has a thickness of at least about 70 mils.

11. The method of claim 9 wherein the film exhibits a flexural modulus of less than about 0.04 MPa.

12. The method of claim 9 wherein the diene rubber comprises natural rubber.

13. The method of claim 9 wherein each antiozonant wax comprises a microcrystalline/paraffinic wax.

14. The method of claim 9 wherein the elastomeric material includes the silica reinforcing component in a total amount of about 0.5 to about 1.5 parts per hundred rubber (PHR), the first antiozonant wax in a total amount of about 0.2 to about 1.0 PHR; and the second antiozonant wax in a total amount of about 0.75 to about 2.5 PHR.

15. The method of claim 14 wherein the elastomeric material includes the silica reinforcing component in a total amount of about 0.5 to about 1.5 parts per hundred rubber (PHR), the first antiozonant wax in a total amount of about 0.2 to about 0.4 PHR; and the second antiozonant wax in a total amount of about 0.75 to about 1.5 PHR.

16. The method of claim 14 wherein the first antiozonant wax has a first kinematic viscosity at 100° C., wherein the first antiozonant wax has a first congealing point, wherein the second antiozonant wax has a second kinematic viscosity at 100° C. greater than the first kinematic viscosity, and wherein the second antiozonant wax has a second congealing point greater than the first congealing point.

17. The method of claim 9 wherein:

forming the first mixture comprises mixing the silica reinforcing component, the first antiozonant wax, a first antidegradant, a first vulcanizing agent, and a first vulcanization accelerator with the first milled diene rubber portion; and forming the second mixture comprises mixing the second antiozonant wax, a second antidegradant, a second vulcanizing agent, a second vulcanization activator, a second vulcanization accelerator, and a pigment with the second milled diene rubber portion.

18. The method of claim 9 wherein:

forming the first mixture comprises excluding the second antiozonant wax from the first mixture; and forming the second mixture comprises excluding the silica reinforcing component from the second mixture.

19. The method of claim 9 wherein:

the first mixture consists essentially of the first antiozonant wax, the silica reinforcing component and the first milled diene rubber portion; and the second mixture consists essentially of the second antiozonant wax and the second milled diene rubber portion.

20. The method of claim 9 wherein:

the first mixture consists of the first milled diene rubber component, the silica reinforcing component, the first antiozonant wax, a first antidegradant, a first vulcanizing agent, and a first vulcanization accelerator; and the second mixture consists of the second milled diene rubber component, the second antiozonant wax, a second antidegradant, a second vulcanizing agent, a second vulcanization activator, a second vulcanization accelerator, and a pigment.

* * * * *